P. BONVILLAIN & E. RONCERAY.

MOLDING MACHINE.

APPLICATION FILED AUG. 6, 1908.

12,877. Reissued Nov. 10, 1908.

2 SHEETS—SHEET 1.

Witnesses:
Harvey L. Lechner
Archworth Martin

Inventors
Philibert Bonvillain
Eugène Ronceray
by their Atty
Paul Synnestvedt

P. BONVILLAIN & E. RONCERAY.

MOLDING MACHINE.

APPLICATION FILED AUG. 6, 1908.

12,877.

Reissued Nov. 10, 1908.

2 SHEETS—SHEET 2.

Witnesses:
Harvey L. Lechner
Archworth Martin

Inventors
Philibert Bonvillain
Eugène Ronceray
by atty
Paul Synnestvedt

UNITED STATES PATENT OFFICE.

PHILIBERT BONVILLAIN AND EUGÈNE RONCERAY, OF PARIS, FRANCE, ASSIGNORS, BY MESNE ASSIGNMENTS, TO E. H. MUMFORD COMPANY, OF PHILADELPHIA, PENNSYLVANIA, A CORPORATION OF PENNSYLVANIA.

MOLDING-MACHINE.

No. 12,877. Specification of Reissued Letters Patent. Reissued Nov. 10, 1908.

Original No. 867,104, dated September 24, 1907, Serial No. 321,315. Application for reissue filed August 6, 1908. Serial No. 447,347.

*To all whom it may concern:*

Be it known that we, PHILIBERT BONVILLAIN and EUGÈNE RONCERAY, citizens of the Republic of France, residing at Paris, in France, have invented new and useful Improvements in or Relating to Molding-Machines, of which the following is a specification.

This invention relates to a pivoted molding-machine, chiefly intended for molding important articles with cores, of fairly large size, which are exposed to the risk of breaking under their own weight, whenever they are taken out of the mold in the ordinary way, from below upwards, that is to say, by being raised. As examples of such objects may be mentioned frying-pans, sauce pan, gear boxes for motor cars, etc. This machine enables the molding to be effected in the ordinary way, but for the purpose of taking the article out of the mold, the apparatus is swung through half a revolution, so that the core which was at the upper end, is now at the bottom end, and is no longer in danger of breaking during the removal from the mold. This arrangement is all the more important as for molding these kinds of articles, excessively dry sand is generally used.

Figure 1:
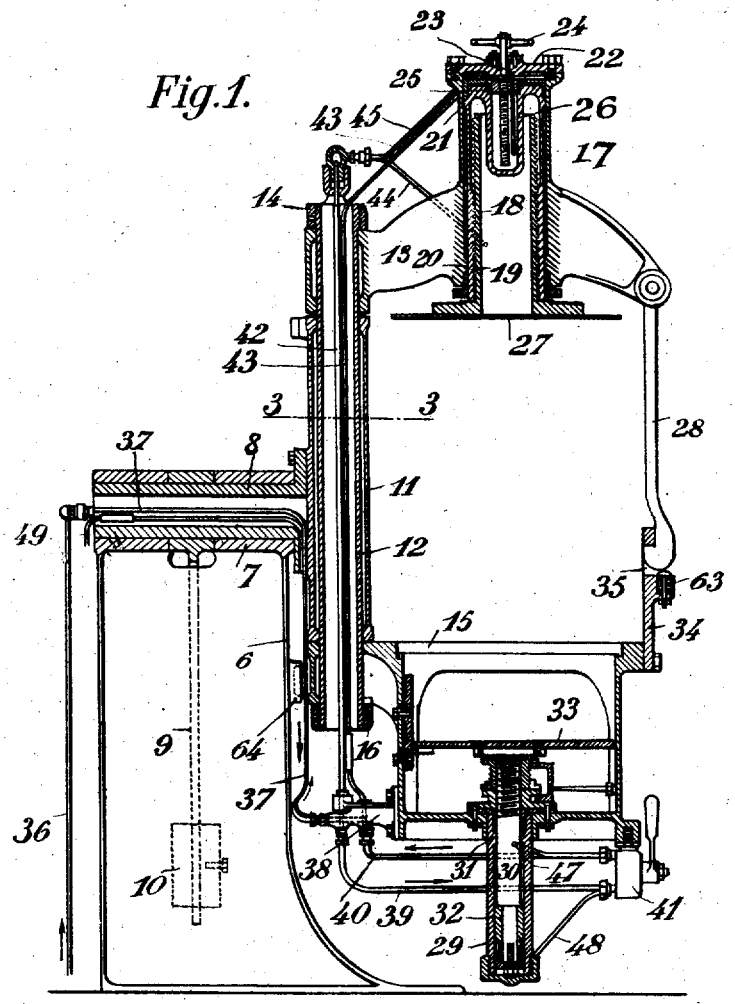
Figure 3:
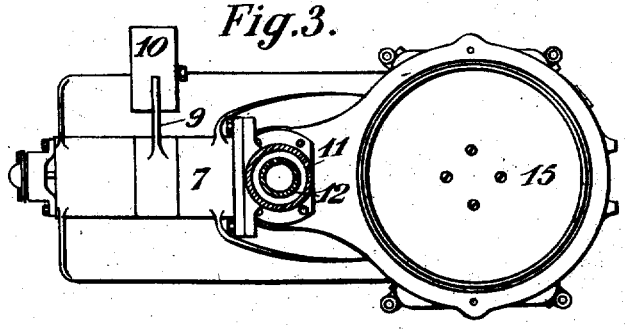
Figure 2:
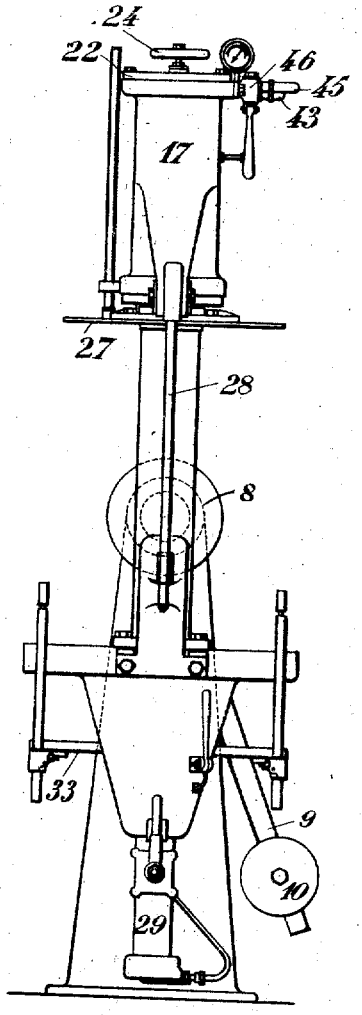
Figure 4:
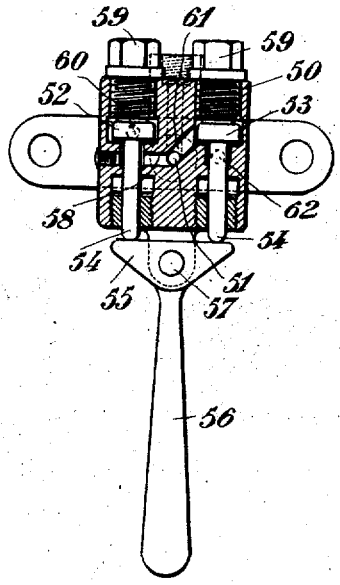
Figure 5:
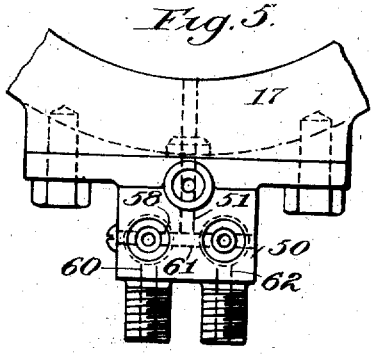

In the accompanying drawing, Figure 1 is a sectional elevation of the machine, Figure 2 is a side elevation, Figure 3 a horizontal section on line 3—3 of Figure 1, and Figure 4 a sectional elevation of a hydraulic distributer. Figure 5 is a top or plan view of a fragment corresponding with Figure 4.

This machine comprises a standard 6 terminating at the top in a socket 7 in which can freely rotate a hollow spindle 8 to which the aforementioned machine proper is secured. To the said spindle 8 is keyed a lever 9 provided near its free end with a suitably arranged balance weight 10. To the spindle 8 is secured a perpendicular hollow column 11 through the whole length of which passes a hollow spindle 12. On one end of the said spindle 12 is loosely mounted the upper cross beam 13 of the machine, capable of rotating on balls on the column 11 and kept on the spindle 12 by a nut 14. To the opposite end of the column 11 is secured the molding table 15 held by a nut 16, on which the said spindle 12 can rotate.

In the center of the cross-beam is cast a cylinder 17 in which can move an expanding hydraulic cylinder made in two parts 18 and 19 screwed one into the other. The outer part 19 fits the interior of a reëntering collar 20 of the cylinder 17, the upper end of this part 19 is provided with a shoulder 21 also fitting the interior of the said cylinder, the striking of the said shoulder against the collar 20 limiting the stroke of the piston. The cylinder 17 is closed by a cover 22 provided with a central stuffing box affording passage to a rod 23 screwthreaded along a portion of its length and provided outside with a hand wheel 24. On the screw threaded portion of the rod 23 is screwed a nut 25, with a hole in which engages a vertical rod 26 secured to the cover 22. The nut 25 rests against the bottom of a recess made for the purpose in the end of the socket 19 of the expanding piston. By turning the hand wheel 24, in suitable direction, the nut 25, and with it the piston 18, 19, are caused to descend, to suit the height of the molding frame which is on the table 15, so that when the compression disk 27 secured to the end of the inner socket 18 of the piston, is raised, the said piston, in rising, strikes the nut 25 which limits its movement to the extent strictly necessary and avoids useless expenditure of water.

To the end of the cross bar 13 is pivoted a hooked rod 28 the object of which will be hereinafter explained.

The molding table 15 comprises a cylinder 29 in which can move a hydraulic discharging piston 30 the upper portion of which fits a reëntering collar 31 of the cylinder 29, while its bottom portion 32 of a larger diameter fits the cylinder 29. On the top of the discharging piston 30 is a molding table 33 on which can be arranged in the usual manner ejectors for the cores and supports for "combs" which might be required during the removal from the mold, more particularly when the articles molded have no "recesses".

The table 15 is provided with a lateral projection 34 having an opening 35 with which the hook of the rod 28 can engage. This arrangement avoids strain on the upper cross bar 13, and on the table 15 when pressure is exercised on the molds. The hook 28 while resisting a pull, braces both the upper and lower parts of the machine.

Water is supplied to the machine by a pipe 36 connected by a rotary union to a second pipe 37 passing through the center of the hollow spindle 8, and connected to a box 38. In this terminate two pipes 39 and 40 connecting it with a distributer 41, two other pipes 42 and 43 passing through the center of the hollow spindle 12 also open into the box. The pipe 42 is provided at its upper end with a rotary union from which start two pipes; a pipe 44 opening into the interior of the cylinder 17, and a pipe 45 opening at the upper end of the same cylinder. The pipe 43, constituting a return also opens into the upper part of the cylinder. The said two pipes 43 and 45 are connected to the cylinder by means of the distributer 46 hereinafter described. From the bottom distributer 41 start two other pipes 47 and 48 opening respectively into the inner and into the upper end of the cylinder 29. The pipes 39 and 47, 39 and 48, 47 and 40, 48 and 40, can communicate with each other by means of the distributer 41 which may be suitably manipulated for the purpose. The pipes 40 and 43 communicate, on the other hand, with the exhaust pipe 49 passing through the center of the hollow spindle 8 by means of the box 38. The upper distributer 46 consists of a box 50 secured to the upper portion of the cylinder 17. This box is provided with a passage or port 51 leading into the interior of the cylinder 17, and at each side of the said passage or port are arranged valves 52 and 53 of which the spindles project from the bottom of the box 50 and rest on a pivoted beam 55 provided with a handle 56 pivoted to a spindle 57 secured to bottom lugs on the box 50. The guide hole through which passes each of the rods 54 is opened out to form a chamber, and into the chamber corresponding to the valve 52 opens a port 58 communicating with the port 51. The valves 52, 53 are arranged in recesses formed by screw plugs 59 compressing springs maintaining the said valves on their seats.

Into the chamber containing the valve 52 opens a water inlet conduit 60, and into the chamber of the valve 53 opens a passage or port 61 communicating with the passage or port 51. In the chamber of the spindle of the valve 53 terminates a drain conduit 62. The conduit 60 is connected to a pipe 45, and the conduit 60 is connected to the conduit 43.

The upper plate 27 is lowered after the length of the piston 18, 19 has been adjusted by screwing or unscrewing its two elements as will be readily understood, so that on arriving at the bottom of its stroke the piston compresses the quantity of sand previously measured to a desired extent. The stroke of the said piston is also adjusted in the opposite direction to the preceding one, by turning the hand wheel 24 the result of which as will be readily understood, is to lower the nut 25 in order that it may form a stop limiting the upstroke of the piston 18, 19. Then the distributer 46 is manipulated by swinging the lever 56 from right to left (Figure 4) the result being that the valve 52 will be raised. A suitable device keeps the lever 56 in any position given to it. Water arriving through the pipe 45 and the conduit 60, passes under the valve 52, enters the port or passage 51, and passes in to the upper portion of the cylinder 17 acting on the piston 18, 19, so that the latter is lowered, and the plate 27 compresses the sand contained in the mold or molds secured to the molding table 15. Before doing that, it is necessary to engage the hook 28 with the orifice 35, so as to avoid strain on the machine. Then the machine is tipped by suitably manipulating the lever 9 provided with the balance weight 10, so that the machine makes half-a-turn on its spindle 8, and the upper portion comes to the bottom. For removing the article from the mold, the hook 28 is disengaged, and the distributer is manipulated by turning the lever 56 from left to right, the result of which is to raise the valve 53 while the valve 52 is brought back to its seat. The port 51 is then in communication by means of the conduit 62 with the drain pipe 43. Water under pressure continues, however, to arrive through the pipe 44 and acts on the shoulder 21 of the piston 19 which is reversed and descends both under the influence of the action of the said pressure and also of the weight of the core and of the articles placed on the plate 27. During this stage of the operation, the distributer 41 is manipulated in such manner that the pipes 47 and 48 communicate with the exhaust pipe 49. The core is lowered with the plate, it can be removed from the mold without difficulty or risk of breaking it, by the action of its own weight, as will be readily understood. When it is desired to remove the finished mold, the cross beam 13 is rotated about the column 11, so as to disengage completely the mold which can then be easily removed. The cross beam 13 is then closed again and the hook 28 replaced, the said hook being held by a spring tappet 63, and the machine is turned about its spindle 8, in order to bring it back to its original position ready for another operation.

When the machine is inverted to effect the discharge of the mold, the sand of the mold is still under pressure by the plate 27, and then the mold is supported by this plate. The pattern plate (or the plate supporting the patterns) should be fixed on the table 15, so that when the plate 27 is made to descend (it being then underneath) the mold descends with said plate leaving the pattern plate suspended from the table 15.

Having now particularly described and ascertained the nature of our said invention and in what manner the same is to be performed, we declare that what we claim is:—

1. In combination in a molding machine, a support, a frame mounted thereon to rotate about a horizontal axis, a flask and pattern supporting table on the frame, a presser plate adapted to compress the sand in the flask against the pattern and power means for operating the presser plate to compress the sand and hold it compressed while the frame is rotated about its horizontal axis.

2. In combination in a molding machine, a support, a frame mounted for inversion about a horizontal axis, a flask and pattern supporting table on the frame, a power operated presser plate adapted to compress the sand in the flask against the pattern and a reciprocatory member mounted on the side of the table opposite to the presser plate and carrying ejecting means for the mold.

3. In combination in a molding machine, a support, a frame mounted thereon to rotate about a horizontal axis, a flask and pattern supporting table on the frame, a power operated presser plate adapted to compress the sand in the flask against the pattern, and a reciprocatory member mounted on the side of the table opposite to the presser plate and adapted to carry ejecting means for the mold, and means whereby the said member is advanced simultaneously with the retraction of the presser plate to free the mold from the pattern.

4. In a molding mechanism mounted for inversion about a horizontal axis, a ramming plunger and an opposing ejecting plunger carrying means for forcing the mold from the pattern when the machine is inverted and such last plunger is uppermost.

5. In a molding mechanism mounted for inversion about a horizontal axis, a ramming plunger and an opposing gravity ejecting plunger carrying means for forcing the mold from the pattern when the machine is inverted and such last plunger is uppermost.

In testimony whereof we have hereunto signed our names in the presence of the two subscribed witnesses.

PHILIBERT BONVILLAIN,
EUGÈNE RONCERAY.

Witnesses:
DEAN B. MASON,
JULIEN TAVERNE.